Figure 1:
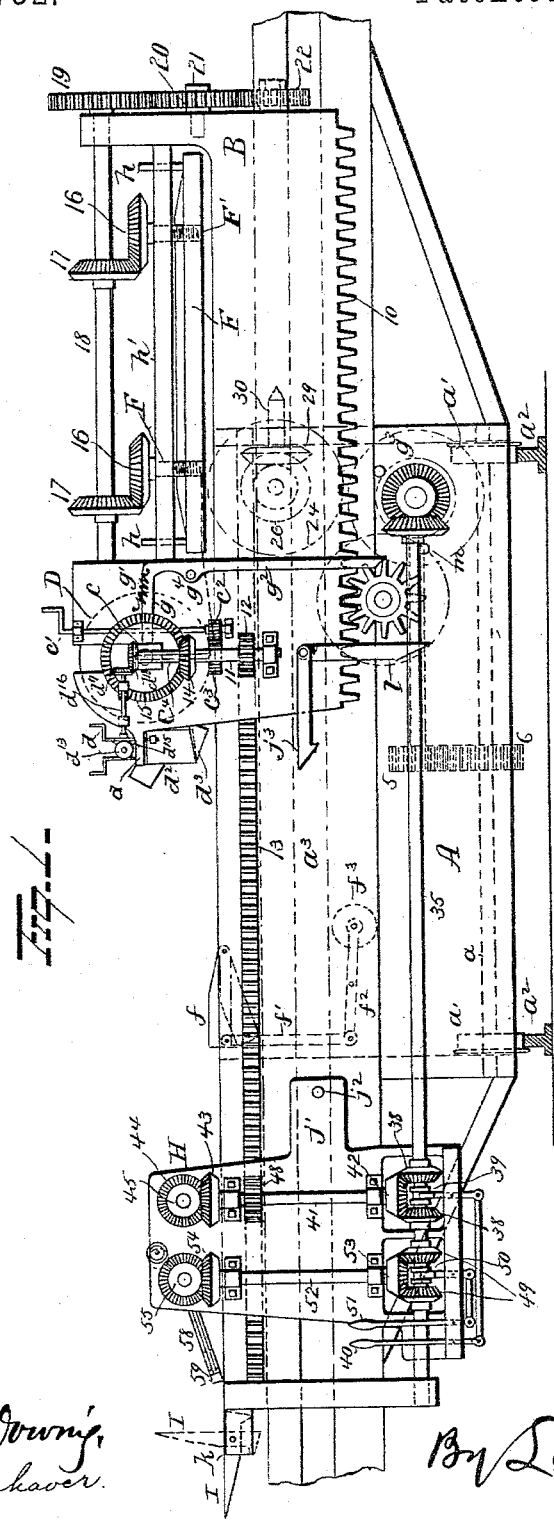

(No Model.) 7 Sheets—Sheet 2.
N. M. MILLER.
MACHINE FOR MANUFACTURING PLATE GLASS.

No. 531,732. Patented Jan. 1, 1895.

Witnesses
G. F. Downing
G. M. Copenhaver

Inventor
N. M. Miller
By Leggett & Leggett
Attorneys (No Model.) 7 Sheets—Sheet 3.

N. M. MILLER.
MACHINE FOR MANUFACTURING PLATE GLASS.

No. 531,732. Patented Jan. 1, 1895.

Witnesses
G. F. Downing,
G. M. Copenhaver.

Inventor
N. M. Miller
By Leggett & Leggett
Attorney (No Model.) 7 Sheets—Sheet 4.
N. M. MILLER.
MACHINE FOR MANUFACTURING PLATE GLASS.
No. 531,732. Patented Jan. 1, 1895.

Witnesses
Geo. F. Downing
G. M. Copenhaver

Inventor
N. M. Miller
By Leggett & Leggett
Attorneys (No Model.) 7 Sheets—Sheet 5.
N. M. MILLER.
MACHINE FOR MANUFACTURING PLATE GLASS.
No. 531,732. Patented Jan. 1, 1895.
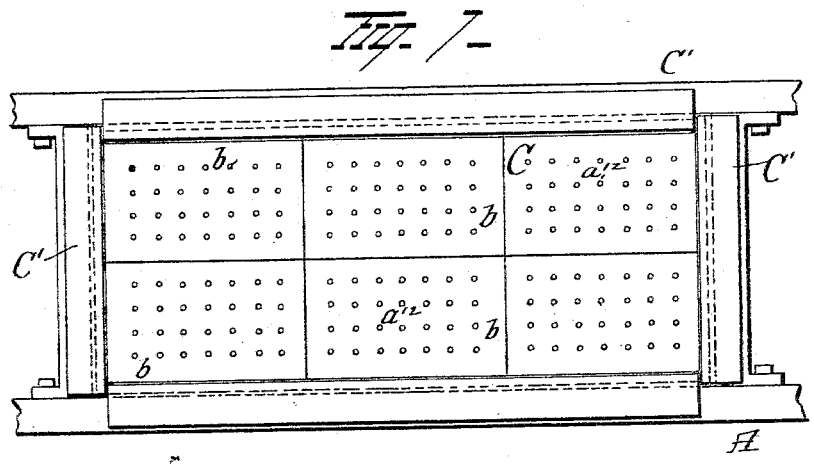
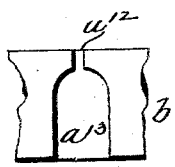

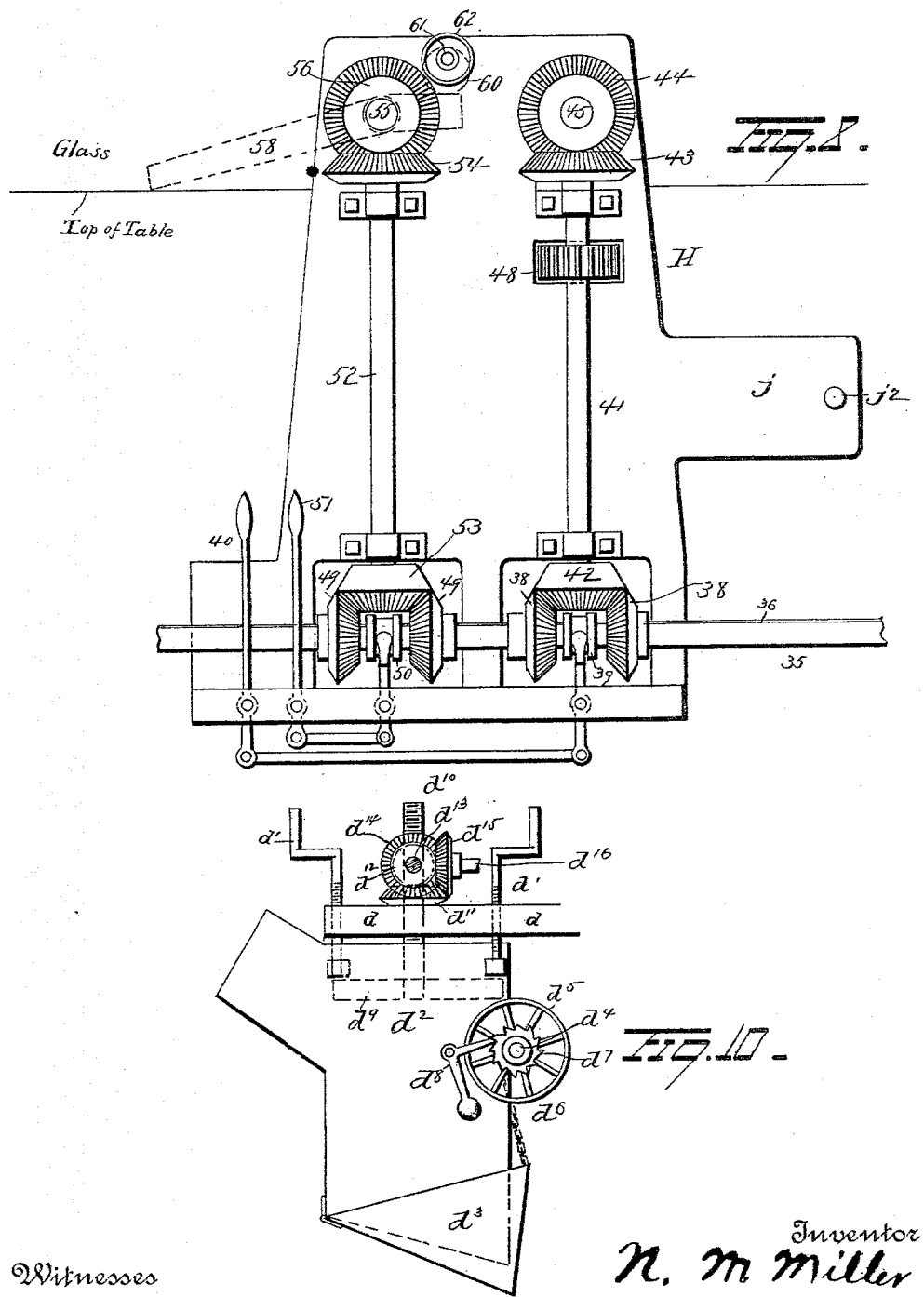

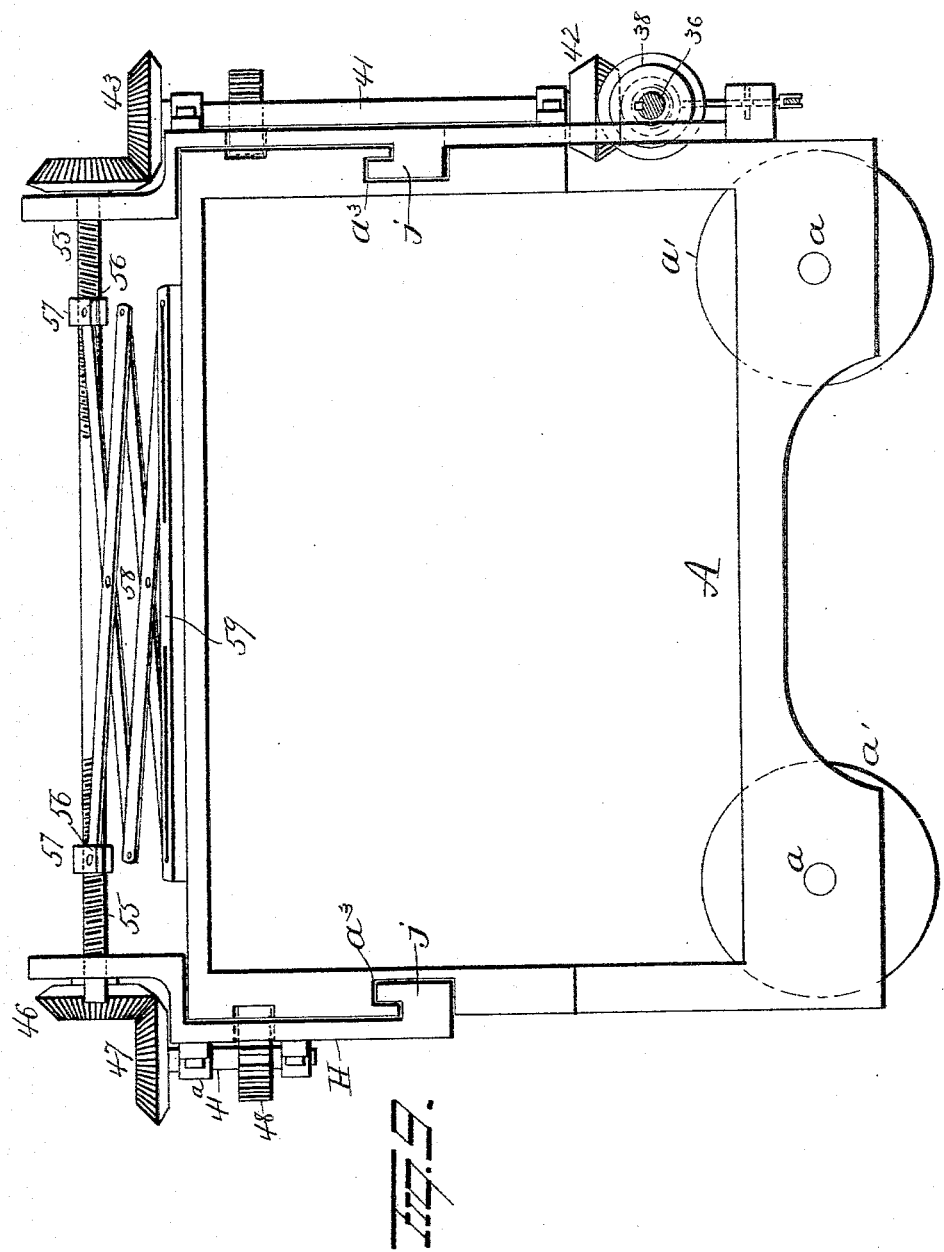

UNITED STATES PATENT OFFICE.

NILES M. MILLER, OF PHILADELPHIA, PENNSYLVANIA.

MACHINE FOR MANUFACTURING PLATE-GLASS.

SPECIFICATION forming part of Letters Patent No. 531,732, dated January 1, 1895.

Application filed August 15, 1893. Serial No. 483,211. (No model.)

*To all whom it may concern:*

Be it known that I, NILES M. MILLER, of Philadelphia, in the county of Philadelphia and State of Pennsylvania, have invented certain new and useful Improvements in Machines for Manufacturing Plate-Glass; and I do hereby declare the following to be a full, clear, and exact description of the invention, such as will enable others skilled in the art to which it appertains to make and use the same.

My invention relates to an improvement in machines for the manufacture of plate and sheet glass,—the object of the invention being to so construct a machine for the purpose stated that the plates of glass produced thereby shall possess great density, clearness and smoothness.

A further object is to produce an apparatus whereby glass can be successively rolled and pressed.

A further object is to provide simple and efficient means for feeding the molten glass to the machine.

A further object is to produce simple means whereby to eject the glass plate after it has been rolled and pressed, from the apparatus into an annealing furnace.

A further object is to so construct the apparatus that a roller is made to pass over the glass; the plate then clamped between two tables and pressure then applied to said plate.

A further object is to provide simple devices whereby to cause the roller to automatically rise after it shall have passed over the glass, and become automatically locked in its elevated position, and also to provide means for automatically releasing said roller when it returns to the starting point.

A further object is to construct an apparatus for the manufacture of plate and sheet glass, in such a manner as to compensate for the expansion of the table due to heat imparted thereto by the molten glass.

A further object is to so construct a table as to permit of the escape of air between the face of the table and the glass thereon.

A further object is to provide operating mechanism for an apparatus for rolling and pressing glass, which shall be so constructed as to be effectual and easy to manipulate or control.

A further object is to produce an apparatus for the manufacture of glass plate, which shall be comparatively simple in construction and effectual in the performance of its functions.

With these objects in view the invention consists in the combination with a frame, and a table, of a carriage or traveling frame carrying a roller and a table, and means for applying pressure, whereby to press a plate or sheet of glass between said tables.

The invention also consists in the combination with mechanism for producing a plate of glass, of means for ejecting the plate of glass from the machine into an annealing oven.

The invention also consists in the combination with an apparatus for producing plate and sheet glass, of means for feeding the molten glass thereto.

The invention also consists in the method of producing plate glass, consisting in successively rolling and pressing the glass.

The invention also consists in the method of producing plate glass, consisting in first passing a roller over the glass, and then subjecting the glass to pressure between tables.

The invention also consists in certain novel features of construction and combinations and arrangements of parts as hereinafter set forth and pointed out in the claims.

Figure 2:
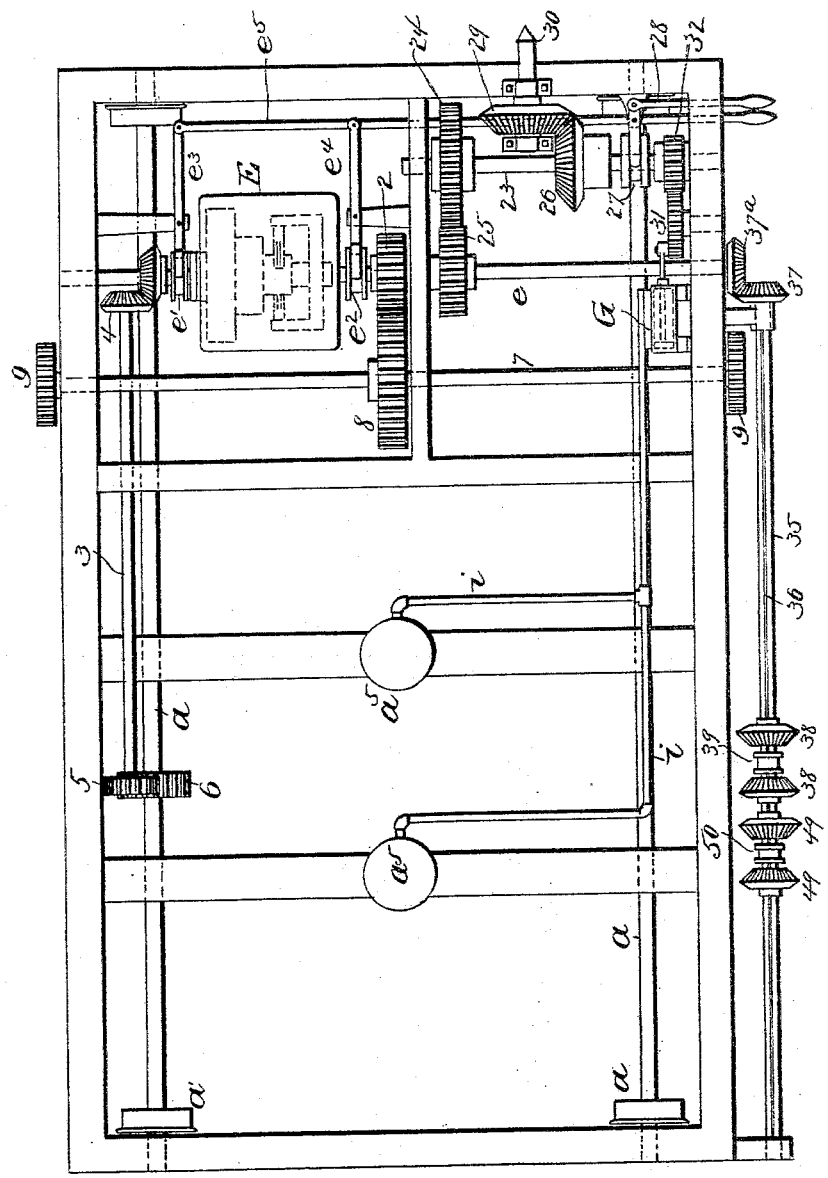
Figure 3:
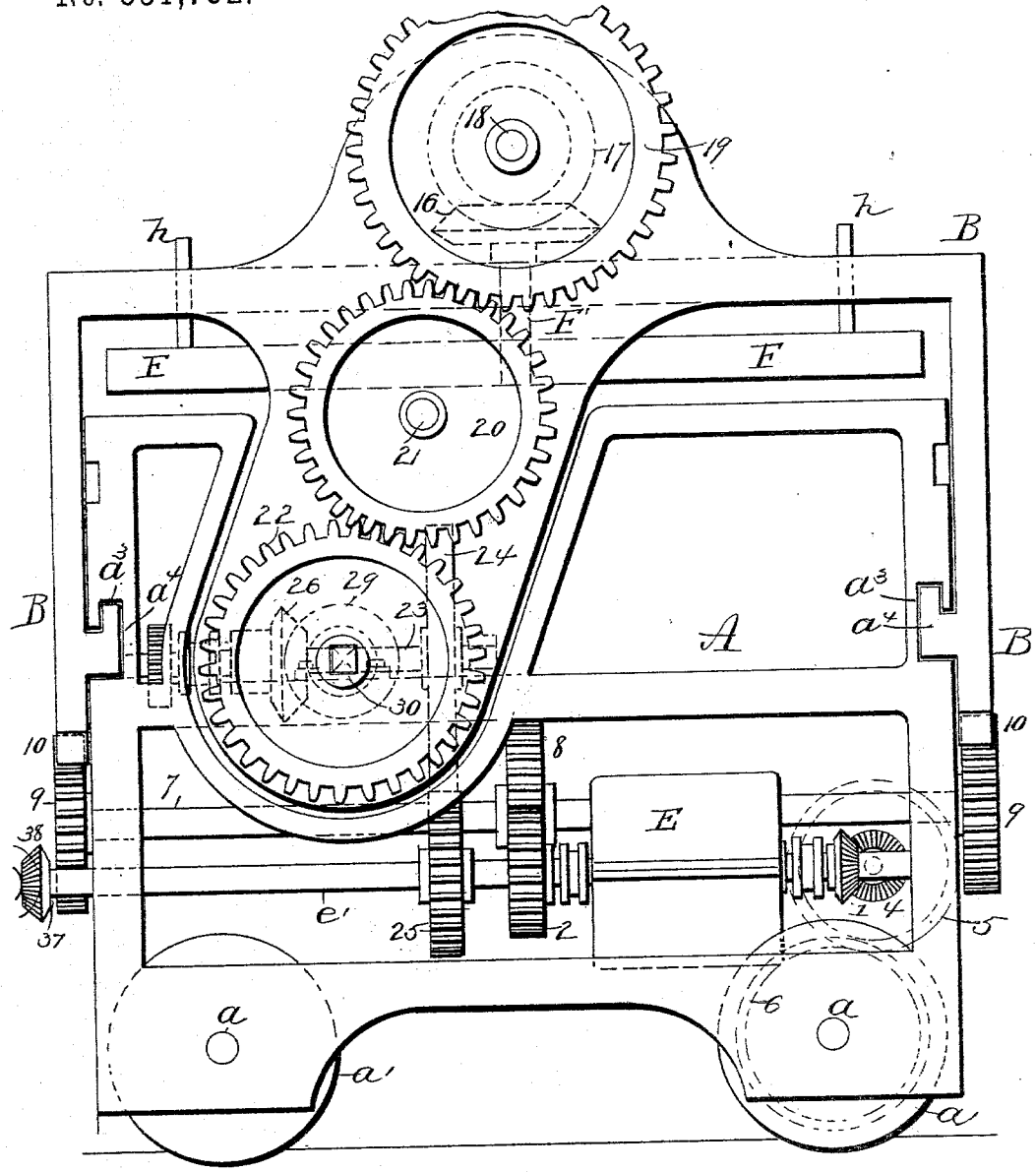
Figure 4:
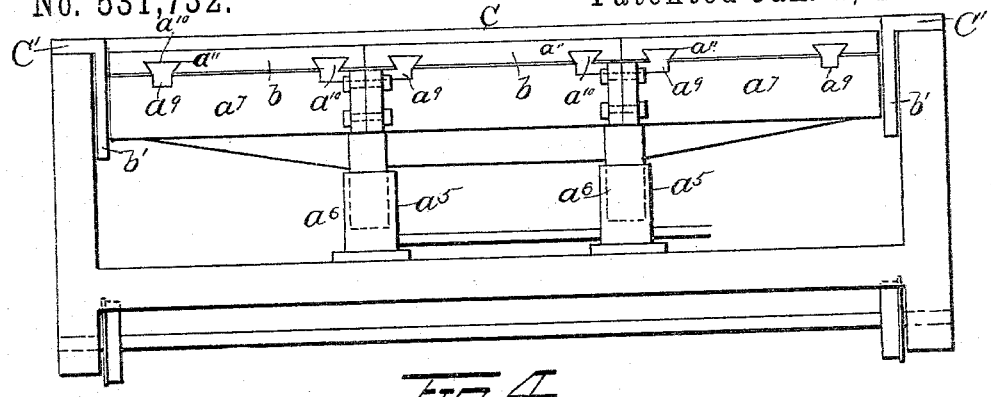
Figure 5:
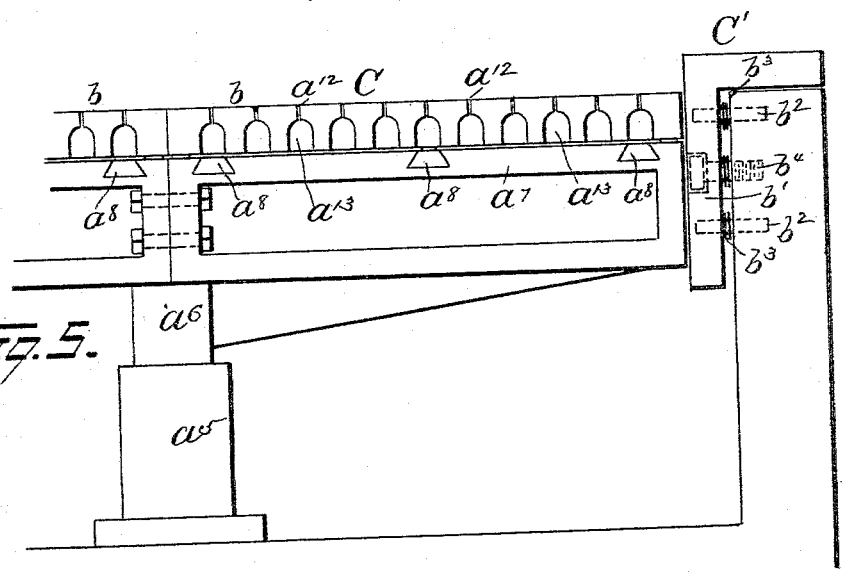

In the accompanying drawings: Figure 1 is a side view of the machine partly broken away. Fig. 2 is a bottom plan view illustrating the means for applying power to the apparatus. Fig. 3 is an end view. Fig. 4 is a side view of a portion of the apparatus, showing the lower table and adjacent parts. Fig. 5 is an enlarged view of a portion of the end of the lower table and framework, showing also means for compensating for the expansion of said table. Fig. 6 is an enlarged view of a portion of the lower table showing one of the perforations therein. Fig. 7 is a plan view of the lower table and a portion of the framework. Fig. 8 is a view illustrating the mechanism for ejecting a plate of glass from the machine into the annealing furnace. Fig. 9 is a view of the ejecting mechanism. Fig. 10 is a detail view of the devices for feeding the molten glass to the lower table.

A represents a main frame, in which shafts or axles *a* are mounted, said shafts or axles carrying wheels $a'$ adapted to run on tracks $a^2$, which latter are located in front of the annealing furnaces. (Not shown.)

The sides of the main frame A are made with L-shaped grooves or ways $a^3$ for the accommodation of similarly shaped flanges or guides $a^4$ projecting from a movable or sliding frame or carriage B.

Located on the frame A is a series of hydraulic cylinders $a^5$, on the plungers $a^6$ of which a lower table C is located. The table C is preferably made in sections, the framework comprising bars $a^7$ having dovetailed grooves or recesses $a^8$ for the reception of dove-tailed bars $a^9$ disposed at right angles to the bars $a^7$. The bars $a^9$ are provided with dove-tailed tenons $a^{10}$ adapted to enter dovetailed grooves $a^{11}$ in plates $b$, which constitute the face of said table C. From this construction and arrangement of parts it will be seen that the table C is expansible in both directions. In order to prevent the collection of air between the face of the plates $b$ and the glass thereon, which would tend to cause the under surface of the glass to be roughened, said plates are made with a number of minute perforations $a^{12}$ for the escape of air, said perforations preferably communicating with chambers $a^{13}$ made in said plates.

Located at the longitudinal edges of the frame A are brackets C′, L-shaped in cross section, their depending portions $b'$ being disposed between the sides of the movable table C and the frame A and the horizontal portions of said brackets being located on top of the side bars of the frame A. The upright portions of the frame A and the depending portions $b'$ of the brackets C′ are made with aligned sockets for the reception of pins $b^2$ and on said pins and between the frame A and brackets C′, springs $b^3$ are located, whereby to maintain said brackets snugly against the table and still permit the expansion of said table. The brackets C′ are fastened to the frame A and held in proper position by means of bolts $b^4$. The upper faces of the brackets C′ are, as shown in Figs. 4 and 5, normally disposed somewhat above the face of the table C, the thickness of the proposed plate of glass being determined by the distance between the upper faces of the table C and the brackets C′. At the ends of the table C, are brackets C², identical with those above described, said brackets C′ being disposed between the brackets C², as shown in Fig. 7.

Mounted in sliding bearings $c$ carried by the movable frame or carriage B in proximity to one end thereof, is a roller D. The roller D is retained in proper position relatively to the table C and moved to or from said table (for adjustment), by means of a crank shaft $c'$, on which a pinion $c^2$ is secured, said pinion meshing with a pinion $c^3$ on one end of a screw $c^4$, the upper end of which is adapted to enter the journal box of the roller D. There may be two sets of these devices, one for each journal box of the roller D. An arm or bracket $d$ projects from the forward end of the frame or carriage B, and through it screw threaded crank shafts $d'$ pass, whereby to adjust a hopper $d^2$ carried by said shafts relatively to the table C. The outlet of the hopper is provided with a hinged hood or gate $d^3$ adapted to normally close said opening. A shaft $d^4$ is mounted in suitable bearings on the hopper $d^2$ and carries a hand wheel $d^5$. A chain $d^6$ is secured at one end to the hood or gate $d^3$ and at its other end is adapted to be wound on the shaft $d^4$. Thus it will be seen that by operating the hand wheel $d^5$ the hood or gate $d^3$ can be operated to open or close the outlet of the hopper. In order to retain the hood or gate $d^3$ in the position in which it shall be set, a ratchet wheel $d^7$ is secured to the shaft $d^4$ and is adapted to be engaged by a pivoted weighted dog $d^8$ pivoted to the hopper. The purpose of the hopper $d^2$ is to contain molten glass and discharge the same on the table C immediately in front of the roller D, when the frame or carriage B is moved in the manner hereinafter explained,—the thickness of the plate to be produced being gaged by the relative position of the free edge of the hood to the outlet of the hopper. In order to compel the molten glass to flow from the hopper $d^2$ regularly and thus be spread on the table in uniform thickness, the devices now to be explained will be employed. A plunger $d^9$ is located within the hopper $d^2$ and adapted to have a vertical movement therein. To this plunger, screws $d^{10}$ are attached and on said screws, pinions $d^{11}$ are located and adapted to receive motion from pinions $d^{12}$ carried by a shaft $d^{13}$. At one end the shaft $d^{13}$ carries a gear $d^{14}$ which receives motion from a gear $d^{15}$ on a shaft $d^{16}$, carrying another gear $d^{17}$ meshing with a gear $d^{18}$ on a shaft 11, to which latter motion is imparted in a manner presently explained. From this construction, it will be seen that as the carriage B moves forward, the molten glass will be positively forced through the hopper and will be deposited on the table in uniform quantities.

Mounted on the main frame A is a motor E (preferably an electric motor), on the shaft $e$ of which, a bevel gear 1 is mounted and is adapted to be made to rotate with said shaft by means of a clutch $e'$. Another gear wheel 2 is mounted on the shaft $e$ and is adapted to be made to rotate therewith by means of a clutch $e^2$. The clutches $e'$ and $e^2$ are operated through the medium of pivoted levers $e^3$, $e^4$, respectively. Motion is imparted by the gear 2 to mechanism for running the carriage B, while the bevel gear 1 imparts motion to mechanism for moving the entire apparatus on the tracks in front of the annealing furnaces,—both of which mechanisms will be presently explained.

As the carriage B and the operating mechanism will not be in operation while the entire apparatus is being moved, the gears 1 and 2 will be brought into operative relation to the main shaft $e$, in a sense, alternately, and for this reason, both pivoted levers $e^3$ and $e^4$ are pivotally connected to the same operating lever $e^5$, a movement of which in one direction will throw the carriage and operating mechanism into motion, and a movement of said lever $e^5$ in the other direction will cause the entire apparatus to move on the tracks $a^2$. A shaft 3 is mounted in the main frame A and at one end carries a bevel 4 adapted to receive motion from the gear 1'. At or near the other end of the shaft 3, a gear wheel 5 is secured and is adapted to impart motion to a gear wheel 6 secured on the shaft or axle $a$, thus propelling the apparatus. In proximity to the motor shaft $e$, a shaft 7 is mounted in the frame A and at a point between its ends, carries a gear wheel 8, adapted to receive motion from the gear wheel 2 on the main shaft $e$. At the end of the shaft 7, gears 9, 9, are secured and adapted to mesh with rack bars 10 on the bottom of the movable frame or carriage. A vertical shaft 11 is mounted in the frame or carriage B and carries a pinion 12 adapted to receive motion from a rack bar 13 secured to the main frame A, as the carriage moves along. The shaft 11 carries a bevel gear 14 adapted to impart motion to a gear 15 carried by the roller D. Thus it will be seen that as the carriage B moves along, the roller D will be positively rotated and made to effectually roll the glass, which, at the same time, is being deposited on the table C by the hopper $d^2$, immediately in front of the roller.

I prefer to provide a duplicate of the means above described for rotating the roller D, at the other end thereof.

For reasons which will appear farther on in this description, it is necessary that the roller D shall be raised off the glass after having passed over it to roll it, and for the accomplishment of this, inclined blocks $f$ are pivotally connected to the main frame A at or near the end of the table C. Two of these blocks will be employed, one at each side of the machine, but as they and the devices connected to them are duplicates, a detail description of one will suffice for both. At the free end of the block $f$, a vertical rod $f'$ is pivoted, and to the lower end of the rod $f'$, one end of a lever $f^2$ is pivoted. The lever $f^2$ is pivotally supported at a point between its ends in a groove or recess in the main frame A and at its free end carries a roller $f^3$, the periphery of which projects to the groove or way $a^3$. The blocks $f$ are normally depressed so as to permit the mechanism for ejecting the rolled and pressed glass plate, to pass over them, but when the roller D reaches the blocks $f$ at the end of its forward movement, it will ride on said blocks and thus be raised off or above the glass over which it has just passed, the blocks being held rigid in their elevated positions by the flanges or guides $a^4$ of the carriage B, which will have become disposed over the rollers $f^3$, thus preventing any movement of the rods and levers connected with said blocks $f$. When the carriage B is moved back, the flanges or guides $a^4$ will move off of the rollers $f^3$ and thus release the blocks $f$, but it is not desired that the roller shall thereby be allowed to again make contact with the glass over which it has already passed and therefore the devices now to be described will be employed for retaining the roller in its elevated position. Sliding bars $g$ are located on the carriage B adjacent to the journals of the roller D and are impelled toward said journals by means of springs $g'$. When the carriage B reaches the forward end of its movement and the roller D rides up on the blocks $f$, the bars $g$ will be forced under the journals of the roller D and thus maintain it elevated until the carriage reaches its normal or starting position, when a pivoted lever $g^2$ projecting downwardly from the bar $g$ will engage a pin $g^3$ projecting from the main frame A, and thus cause the bar $g$ to be withdrawn and release the roller D, allowing it to rest on incline $g^4$ at the starting point. (See dotted line, Fig. 1.)

Carried by the movable frame or carriage B is a vertically movable table F having face plates similar to those of the table C, said plates being provided with minute perforations, the same as the face plates of the table C. The table F is provided with a series of guide bars $h$ adapted to pass loosely through perforations made in a bar or bars $h'$ secured to the frame or carriage B. Screws F' are passed through threaded perforations in the table F and the bars $h'$ and are adapted to cause said table to have a vertical movement in the manner presently explained. The screws are provided at their upper ends with bevel gears 16 adapted to receive motion from similar gears 17 carried by a shaft 18 mounted in the frame or carriage B. At one end of the shaft 18 a gear wheel 19 is secured and receives motion from a gear wheel 20 mounted on a journal 21 projecting from the carriage B. The gear wheel 20 receives motion from a gear wheel 22 carried by the carriage B. A shaft 23 is mounted in the main frame A in proximity to one end, and carries a gear wheel 24 adapted to receive motion from a gear wheel 25 carried by the main shaft $e$. On the shaft 23 a bevel gear 26 is loosely mounted and adapted to be made to rotate with said shaft by means of a clutch 27, which is manipulated by a lever 28. The gear wheel 26 is adapted to transmit motion to a bevel gear 29 secured to a short shaft 30. Now when the carriage B shall have moved forward to the end of its movement, and the roller D carried by said carriage shall have rolled the glass on the table C, the upper table F will be directly over the plate of glass on the lower table C, and the short shaft 30 will enter an angular opening in the gear wheel 22. Should the clutch 27 be now operated to lock the gear 26 to the shaft 23, motion will be imparted to the screws F', through the medium of the intermediate gearing, and the upper table will thus be made to descend upon the glass on the lower table C. When the parts are in these positions, the hydraulic cylinders $a^5$ will be charged with water through pipes $i$, by means of a pump G. Thus it will be seen that the plate of glass, after having been rolled as above explained, will be subjected to great pressure between the tables C and F, thereby rendering said plate of glass compact, smooth and clear.

The pump G is driven by a gear wheel 31, which is connected with the plunger of said pump. The gear wheel 31 receives motion from a gear wheel 32 mounted loosely on the shaft 23. The gear wheel 32 is adapted to be made to rotate with the shaft 23 by means of the clutch 27, which is operated by means of a lever 28.

At the forward end of the main frame A a carriage H, is located and provided with flanges or guides $j$ adapted to run in the grooves $a^3$ in the main frame A. The carriage H is made with an arm $j'$ respectively at both sides, from which a pin $j^2$ projects, and with this pin the hooked end of an arm $j^3$, pivoted to the carriage B, is adapted to engage when the latter reaches the forward end of its movement, so that when the carriage B moves back to its normal position, the carriage H will move back with it for a purpose which will be fully explained farther on.

Mounted in the main frame A and extending to a point in proximity to the forward end thereof, is a shaft 35, having a groove 36 running its full length or approximately its full length. The shaft 35 is provided at one end with a bevel gear 37 adapted to receive motion from a bevel gear $37^a$ on the end of the main motor shaft $e$. On the shaft 35, two bevel gear wheels 38, 38, are loosely mounted and between these gears, a clutch 39 is located and adapted to be operated by means of a lever 40, whereby to lock either of said gears to the shaft 35. This clutch is provided with a spline adapted to enter the groove 36 whereby it is rotated with shaft 35, but is free to slide thereon. A vertical shaft 41 is mounted in the carriage H and at its lower end carries a bevel gear 42 adapted to mesh with the gears 38, 38. At the upper end of the shaft 41, a bevel gear 43 is located and adapted to mesh with a bevel gear 44 on a horizontal shaft 45 mounted in the carriage H. On the other end of the horizontal shaft 45 a bevel gear 46 is secured and adapted to mesh with a bevel gear 47 at the upper end of another vertical shaft $41^a$ mounted in the carriage H. On each vertical shaft 41, $41^a$, a gear wheel 48 is secured and adapted to mesh with the rack bars 13 carried by the main frame A. From this construction and arrangement of parts it will be seen that when the vertical shafts 41, $41^a$ are rotated, the carriage H will be moved according to the direction of rotation of said shafts which will be governed by means of the clutch 39. Two bevel gears 49, 49, are also mounted loosely on the shaft 35 and between them a clutch 50 is located, said clutch being adapted to be operated by means of a lever 51. A vertical shaft 52 is mounted in the carriage H and at its lower end is provided with a bevel gear wheel 53 adapted to mesh with the bevel gears 49, 49. A bevel gear 54 is secured at the upper end of the vertical shaft 52 and meshes with a bevel gear at one end of a shaft 55 having a double screw thread. Mounted on the double screw threaded shaft 55 are nuts 56 having arms 57, and pivotally connected to said nuts is a frame 58 in the form of lazy tongs, having a horizontal slotted bar 59 at its forward end. The lazy-tong frame 58 is maintained in a normally inoperative position by means of a cam 60 adapted to engage the arms 57 of the nuts 56, said cam being carried by a shaft 61, having a wheel 62 by means of which to operate it.

From the forward end of the main frame A, an arm $k$ projects (one on each side) and to these arms a table I is pivotally connected, the normal position of said table being that shown in dotted lines in Fig. 1, when in use.

When the carriages B and H are moved backwardly, as above explained, an arm $l$ projecting downwardly from the hook-shaped arm $j^3$ will engage a pin $m$, when the carriage B reaches the rearward extremity of its movement, thereby disengaging the carriage H from the carriage B. The apparatus will be run on the tracks $a^2$ until it is directly in front of the door of an annealing furnace, when the table I will be turned down and made to enter the oven and thus constitute a way or slide whereby to facilitate the insertion of the glass plate into the furnace. The shafts 41 will now be put into operation by means of the clutch 39, as above explained. The carriage H will thereby be made to move forward, the lazy-tong frame pushing the rolled and pressed glass plate (which had been previously raised by the hydraulic devices) before it. In order to force the plate of glass completely into the furnace, the shaft 52 will be made to rotate by the manipulation of the clutch 50, and the shaft 55 thereby made to rotate and cause the lazy-tong frame to be distended, as will be readily understood, thus forcing the plate of glass completely within the furnace.

The apparatus is now ready for a repetition of the above described operations for rolling and pressing a plate of glass and the insertion of the same into the annealing furnace.

While my improvements may appear at first glance to be more or less complicated, they are in fact, very simple, and by their use, a glass plate having great density, smoothness and clearness can be produced without the necessity of successive rolling and without the necessity of turning the plate being operated upon.

By my improvements, the rolled and pressed glass plate will be easily, quickly and effectually inserted into the annealing furnace without the necessity of handling it.

On the whole my improved apparatus is efficient, in every respect, in the performance of its functions.

Numerous slight changes might be made in the details of construction of my invention without departing from the spirit thereof or limiting its scope and hence I do not wish to limit myself to the precise details of construction herein set forth, but, Having fully described my invention, what I claim as new, and desire to secure by Letters Patent, is—

1. The herein described method of making a plate glass consisting in depositing plastic glass onto a table, and successively rolling and pressing the glass without removing it from said table, substantially as set forth.

2. The herein described method of producing plate glass consisting in first depositing the plastic glass in the form of a layer or plate on a table, passing a roller over such layer or plate, and then subjecting it to pressure without removing it from the table, substantially as set forth.

3. The herein described method of producing plate glass consisting in first spreading a layer or plate of plastic glass on a table, following up the deposit of plastic or molten glass with a roller and then subjecting the entire surfaces of the plate to pressure, substantially as set forth.

4. In a machine for producing plate glass, the combination with a table adapted to receive a deposit of molten or plastic glass, of a traveling frame carrying a roller and a movable table, means for moving said carriage, operating the roller and moving the table, substantially as set forth.

5. In a machine for producing plate glass, the combination with means for pressing the glass, of an ejector for forcing the glass plate from the apparatus into an annealing furnace, substantially as set forth.

6. In an apparatus for the manufacture of glass plate, the combination with a frame, of a table adapted to receive the molten glass, and cushioned brackets carried by said frame adapted to automatically compensate for the expansion of said table, substantially as set forth.

7. In an apparatus for the manufacture of plate glass, the combination with a frame, of a table adapted to receive the molten glass, and brackets carried by said frame and adapted to bear, with a yielding pressure, against the edges of said table, substantially as set forth.

8. In an apparatus for the manufacture of plate glass, the combination with a frame, of a table adapted to receive molten glass, brackets carried by said frame and adapted to bear against the edges of said table, pins inserted between the brackets and table and adapted to enter the same, and springs on said pins between the brackets and table, substantially as set forth.

9. In an apparatus for the manufacture of plate glass, a table comprising a series of bars, bars movably connected to said bars at right angles thereto, and face plates movably connected to said bars at right angles thereto, substantially as set forth.

10. In an apparatus for manufacturing plate glass, a table comprising a series of bars, dove-tailed bars movably connected to said bars at right angles thereto, said bars having dove-tailed projections, and face plates having dove-tailed recesses for the reception of said dove-tailed projections, substantially as set forth.

11. In an apparatus for the manufacture of plate glass, the combination with a frame and a table, of brackets carried by said frame and adapted to bear against the edges of the table with a yielding pressure, said brackets having depending portions disposed between the frame and table and horizontal portions adapted to rest on the top of said frame, substantially as set forth.

12. In an apparatus for the manufacture of plate glass, the combination with a frame, and hydraulic jacks located thereon, of a table for the reception of molten glass, mounted on the plungers of said hydraulic jacks, substantially as set forth.

13. In a machine for the manufacture of plate glass, the combination with a frame and means for pressing glass, of a carriage on said frame, and means for actuating said carriage whereby to eject the plate of glass from the apparatus into an annealing oven, substantially as set forth.

14. In a machine for the manufacture of plate glass, the combination with a frame and means for pressing glass, of a carriage on said frame, means for actuating said carriage whereby to eject the glass from the apparatus, and a table at one end of the apparatus over which the glass plate is ejected, substantially as set forth.

15. In a machine for the manufacture of plate glass, the combination with a frame, a table thereon over which the glass passes as it is ejected from the apparatus and means for pressing the glass, of a movable ejector mounted on the frame and means for actuating same, substantially as set forth.

16. In a machine for the manufacture of plate glass, the combination with a frame and means for pressing glass, of a carriage carried by said frame, means for moving said carriage to force the glass plate forward, and devices carried by said carriage adapted to positively force the plate of glass beyond the end of the machine and into an annealing furnace, substantially as set forth.

17. In a machine for the manufacture of plate glass, the combination with a frame and means for pressing glass, of a carriage mounted on said frame, a lazy-tong frame carried by said carriage and means for distending said lazy-tong frame to positively force the glass plate off the machine into an annealing furnace, substantially as set forth.

18. In a machine for the manufacture of plate glass, the combination with a frame, of a carriage mounted thereon, a threaded shaft mounted in said carriage, means for rotating said threaded shaft, and a lazy-tong frame mounted on said threaded shaft and adapted to eject a plate of glass from the machine, substantially as set forth.

19. In a machine for the manufacture of plate glass, the combination with a frame and a carriage mounted thereon, of a threaded shaft mounted on said carriage, a lazy-tong frame mounted on said threaded shaft and adapted to eject a plate of glass from the machine, a gear carried by said threaded shaft, a shaft having a gear at one end adapted to mesh with the gear on the threaded shaft and a gear on the other end, a shaft mounted in the frame, means for driving said shaft, gears mounted on said shaft and adapted to mesh with said last-mentioned gear, and a clutch on the shaft mounted in the frame, between the gears on said shaft, substantially as set forth.

20. In an apparatus for the manufacture of plate glass, the combination with a frame, of a carriage mounted thereon, a threaded shaft mounted on said carriage, means for rotating said threaded shaft, nuts mounted on said threaded shaft and having arms projecting therefrom, a lazy-tong frame connected to said nuts, and a cam adapted to engage the arms projecting from said nuts whereby to raise and lower said lazy-tong frame, substantially as set forth.

21. In an apparatus for the manufacture of plate glass, the combination with a frame, of a carriage mounted thereon and adapted to have a sliding movement, vertical shafts carried by said carriage, gears on said shafts at points between their ends, rack bars on the frame with which said gears mesh, a horizontal shaft, means for driving the same, gears on said horizontal shaft, a clutch between said gears, gear wheels on the lower ends of the vertical shafts adapted to mesh with the gears on the horizontal shaft, and a shaft having gears at its ends adapted to mesh with gears at the upper ends of said vertical shafts, substantially as set forth.

22. In an apparatus for the manufacture of plate glass, the combination with a frame and a table mounted therein, of a carriage mounted on said frame, mechanism carried by said carriage for rolling the glass on said table, an ejecting mechanism adapted to slide on said frame, a hook carried by said carriage and adapted to engage a pin on said ejecting mechanism, means for moving said carriage and ejecting mechanism, and a pin adapted to release said hook from the ejecting mechanism, substantially as set forth.

23. In an apparatus for the manufacture of plate glass, the combination with a frame and a table mounted therein, of a carriage mounted on said frame, a roller mounted in said carriage and adapted to pass over the glass on said table, and means for raising said roller off the glass at the forward end of its movement, substantially as set forth.

24. In an apparatus for the manufacture of plate glass, the combination with a frame and a table carried thereby, of a carriage, mounted on said frame, a roller mounted in said carriage, means for elevating the roller at the forward end of its movement, and means for automatically retaining said roller elevated until it reaches its normal position, substantially as set forth.

25. In an apparatus for the manufacture of plate glass, the combination with a frame and a table carried thereby, of a carriage mounted on said frame, a roller mounted in said carriage, means for elevating said roller at the forward end of its movement, means for automatically retaining said roller elevated until it reaches its normal position, and means for automatically releasing said roller when it reaches its normal position, substantially as set forth.

26. In an apparatus for the manufacture of plate glass, the combination with a frame and a table carried thereby, of a carriage mounted on said frame, a roller mounted in said carriage and adapted to pass over glass on said table, a beveled block pivoted at one end to said frame in the path of said roller, a bar pivoted to the free end of said block, a lever pivoted at a point between its ends and pivoted at one end to said bar, and a roller at the free end of said pivoted lever in the path of the guide of said carriage, substantially as set forth.

27. In an apparatus for the manufacture of plate glass, the combination with a frame and a table carried thereby, of a carriage mounted on said frame, a roller mounted in said carriage and adapted to pass over glass on said table, means for raising said roller at the forward end of its movement, sliding bars adapted to project under the journals of said roller to retain it elevated, springs for projecting said bars, pivoted levers connected to said bars, and pins or stops on the frame adapted to be engaged by said levers when the carriage reaches its normal or starting position, for withdrawing said bars to release the roller, substantially as set forth.

28. In an apparatus for the manufacture of plate glass, the combination with a frame and a table carried thereby, of a carriage mounted on said frame, a table carried by said carriage and adapted to be disposed over the table in the main frame when said carriage moves forward, and means for moving the table carried by the carriage in a vertical direction, substantially as set forth.

29. In an apparatus for the manufacture of plate glass, the combination with a main frame and a table mounted therein, of a carriage mounted on said main frame, a table on said carriage and adapted to be disposed over the table when the carriage reaches the forward end of its movement, screws passing through said table and into the carriage, gear wheels carried by said screws, a shaft mounted on the carriage, gear wheels carried by said shaft and adapted to mesh with the gear wheels on the screws, and means for driving said shaft, substantially as set forth.

30. In an apparatus for the manufacture of plate glass, the combination with a main frame and table mounted therein, of a carriage mounted on said main frame, a table carried by said carriage and adapted to be disposed over the table in the main frame when the carriage reaches the forward end of its throw, screws passing through the table in the carriage and into said carriage, gears carried by said screws, a shaft mounted in the carriage, gears carried by said shaft and adapted to mesh with the gears on the screws, a gear at the end of said shaft, a gear carried by the carriage and having an opening therein, a gear mounted between the last-mentioned gear and the gear on the end of said shaft, a short shaft carried by the main frame and adapted to enter the pinion having an opening therein when the carriage moves forward, a gear carried by said short shaft, a shaft mounted at right angles to said shaft and having a gear loosely mounted thereon and adapted to mesh with the gear on the short shaft, and a clutch for locking said loose gear to its shaft, substantially as set forth.

31. In a machine for the manufacture of plate glass, the combination with a frame, of hydraulic cylinders mounted therein, plungers in said cylinders, a table mounted on said plungers and adapted to receive glass thereon, a table adapted to be disposed over the table in the frame, pipes connected with said cylinders, a pump with which said pipes communicate, a motor, and gearing connecting said motor with the pump, substantially as set forth.

32. In an apparatus for the manufacture of glass, the combination with a frame, of hydraulic jacks mounted therein, a table mounted on said hydraulic jacks and adapted to receive glass, a pump, pipes connecting said hydraulic jacks and pump, a gear connected with the plunger of said pump, a shaft located in proximity to said gear, and having a gear loosely mounted thereon and adapted to mesh with the first-mentioned gear, a clutch on said shaft, a gear at the other end of said shaft, a motor, a motor shaft, and a gear on the motor shaft and adapted to mesh with the last mentioned gear, substantially as set forth.

33. In an apparatus for the manufacture of plate glass, the combination with a frame, shafts or axles mounted in said frame, and wheels carried by said shafts or axles and adapted to run on tracks, of a motor mounted on the frame, a pinion carried by the shaft of said motor, a shaft parallel with one of said axles, a pinion on said shafts adapted to mesh with the pinion on the motor shaft, a gear on said shaft, and a gear on one of the axles adapted to mesh with said last mentioned gear, substantially as set forth.

34. In an apparatus for the manufacture of plate glass, the combination with a main frame, of a carriage mounted thereon and carrying mechanism for pressing glass, of rack bars carried by said carriage, a shaft mounted in the main frame, gears carried by said shaft and adapted to mesh with said rack bars, a gear carried by said shaft at a point between its ends, a motor, and a gear carried by the motor shaft and adapted to mesh with said last-mentioned gear, substantially as set forth.

35. In an apparatus for the manufacture of plate glass, the combination with a main frame and a carriage mounted thereon and carrying mechanism for pressing glass, of a motor, a shaft mounted in the frame, gears carried by said shaft, rack bars on the carriage adapted to mesh with said gears, a gear carried by said shaft at a point between its ends, a gear mounted loosely on the motor shaft and adapted to mesh with said last-mentioned gear, a clutch on the motor shaft for locking said gear thereto, a pinion at the end of the motor shaft, a clutch on the motor shaft for locking said pinion thereto, a lever for operating said clutches, and gearing between said pinion and an axle of the machine for driving the same, substantially as set forth.

36. In an apparatus for the manufacture of plate glass, the combination with a main frame, and a carriage mounted thereon, of a motor mounted on the main frame, a shaft mounted in the main frame and adapted to receive motion from said motor, gears at the ends of said shaft, rack bars on the carriage with which said gears mesh, a roller carried by said carriage, gears at the ends of said roller, vertical shafts, pinions carried by said vertical shafts and adapted to mesh with the gears at the ends of the roller, gears secured on said vertical shafts at points between their ends, and rack bars carried by the main frame with which said last-mentioned gears mesh, whereby to impart motion to said roller as the carriage moves along, substantially as set forth.

37. In an apparatus for the manufacture of plate glass, the combination with a frame, a table mounted therein, a carriage mounted on the frame and a roller mounted in said carriage, of an arm projecting from said carriage, a screwthreaded rod passing through said arm and having a crank arm at one end, and a hopper secured to the lower end of said rod, for distributing molten glass on said table, substantially as set forth.

38. In an apparatus for the manufacture of plate glass, the combination with a frame, a table mounted therein, a carriage and a roller carried by said carriage, of a hopper carried by the carriage, a hinged gate at the lower end of said hopper, a shaft mounted on the hopper, a chain connected at one end to the hinged gate and adapted to wind on said shaft, means for turning the shaft, a ratchet wheel on the shaft, and a weighted dog adapted to engage said ratchet wheel, substantially as set forth.

39. In an apparatus for the manufacture of plate or sheet glass, the combination with a table, a carriage adapted to move over said table, and means for pressing glass, of a hopper carried by said carriage and adapted to deposit molten glass on said table, a plunger in said hopper, screw-shafts connected to said plunger and means for automatically rotating said screw-shafts as the carriage moves, whereby to move the plunger in the hopper, substantially as set forth.

40. In an apparatus for the manufacture of plate or sheet glass, the combination with a table, a carriage adapted to move over said table, means for pressing glass, and operating mechanism, of a hopper carried by said carriage, a plunger within said hopper, screw shafts connected to said plunger, pinions on said screw shafts, a shaft having pinions to mesh with the first-mentioned pinions, and a gear carried by said last-mentioned shaft and adapted to receive motion from the operating mechanism, substantially as set forth.

In testimony whereof I have signed this specification in the presence of two subscribing witnesses.

NILES M. MILLER.

Witnesses:
S. M. VERNON,
J. WILLIAMS.